United States Patent [19]

Takada et al.

[11] Patent Number: 4,723,145

[45] Date of Patent: Feb. 2, 1988

[54] COLOR IMAGE FORMING APPARATUS COMPRISING SEPARATE MOTORS FOR DRIVING THE IMAGE BEARING MEMBER AND THE TRANSFER MATERIAL SUPPORTING MEMBER

[75] Inventors: Yusaku Takada, Tokyo; Kenji Takeda, Yokohama, both of Japan

[73] Assignee: Canon Kabushiki Kaisha, Tokyo, Japan

[21] Appl. No.: 841,268

[22] Filed: Mar. 19, 1986

[30] Foreign Application Priority Data

Mar. 22, 1985 [JP] Japan .................................. 60-58014
Mar. 22, 1985 [JP] Japan .................................. 60-58015

[51] Int. Cl.[4] .............................................. G01G 15/00

[52] U.S. Cl. ................................ 355/3 TR; 355/30 R; 355/3 SH; 355/14 SH; 355/14 TR

[58] Field of Search .................. 355/3 R, 14 R, 3 SH, 355/3 TR, 4, 14 SH, 14 TR

[56] References Cited

U.S. PATENT DOCUMENTS 3,987,756 10/1976 Katayama et al. ................. 355/4 X
4,072,415 2/1978 Inoue et al. ........................ 355/14 R
4,477,176 10/1984 Russel ................................. 355/4 X
4,531,828 7/1985 Hoshino .............................. 355/4 X
4,629,173 12/1986 Hashimoto et al. ......... 355/3 SH X

*Primary Examiner*—A. C. Prescott
*Attorney, Agent, or Firm*—Fitzpatrick, Cella, Harper & Scinto

[57] ABSTRACT

A color image forming apparatus including an image bearing member movable along an endless path, on which color toner images are formed, a transfer material supporting member movable along an endless path for supporting a transfer material and conveying it to an image transfer position where the color toner images are superimposed and transferred sequentially to the transfer material. Also provided are a first driving motor for driving the image bearing member, and a second driving motor, separately provided from the first motor, for driving the transfer material supporting member. In addition, the apparatus includes a detector for detecting the speed of the surface of the transfer material, a discriminator for determining whether the speed variations detected by the detector are within a tolerable range, and a control, responsive to the discriminator, for stopping the operation of a subsequent image transfer step when the detected speed variation is beyond the tolerable range, and for repeating latent image forming, developing, and transfer steps.

18 Claims, 16 Drawing Figures

COLOR IMAGE FORMING APPARATUS COMPRISING SEPARATE MOTORS FOR DRIVING THE IMAGE BEARING MEMBER AND THE TRANSFER MATERIAL SUPPORTING MEMBER

FIELD OF THE INVENTION AND RELATED ART

The present invention relates to a color image forming apparatus such as a copying machine and recording apparatus. More particularly, the invention relates to a color image forming apparatus of an image transfer type having an improved driving mechanism for a transfer material supporting member and for an image bearing member such as a photosensitive member, an insulating member and a magnetic member.

In an electrophotographic image forming apparatus, for example, of the image transfer type, an image bearing member, in the form of a photosensitive drum or belt, and a transfer material supporting drum or belt equipped with a gripper or the like are closely disposed or contact each other and are synchronously rotated, so that toner images of different colors formed on the image bearing member are sequentially transferred and superimposed onto the same transfer material supported on the transfer material supporting member. Next, the toner image on the transfer material is fused and fixed on the transfer material.

The driving mechanism for the image bearing member and the transfer material supporting member, as shown in FIG. 2, comprises a gear fixedly mounted to the image bearing member which meshes with a gear fixedly mounted to the transfer material supporting member. One of the gears is driven by a motor through a driving gear or a belt having gear teeth. In this mechanism, the image bearing member and the transfer material supporting member are mechanically coupled so that they are driven by a single driving system so as to provide the synchronization therebetween.

However, it has been found that there is a problem in this mechanism, which arises from variations in the load on the transfer material supporting member. For example, when the gripper of the supporting member for gripping the transfer material is released by a cam or the like, contact with the cam changes the load against the rotation, which is transmitted to the driving motor through the driving system such as the gear. As a result, the rotational speed of the motor changes, and therefore, the rotation of the motor is not uniform. This non-uniform rotation leads to a blurred image in a conventional analog type color copying machine. In a digital type copying machine or printer, the image bearing member is scanned by a scanner such as a laser scanner and a liquid crystal shutter or the like with a very small pitch in a direction perpendicular to the direction of the image bearing member movement. Therefore, the above-described non-uniform rotation appears in a resultant image as a image density difference, which is conspicuous. Particularly in the case of a full-color copying, this results in a change of color or tone of the color, since three or four colors are superimposed.

SUMMARY OF THE INVENTION

Accordingly, it is a principal object of the present invention to provide an image forming apparatus which does not have the drawbacks resulting from one of the image bearing member and the transfer material supporting member driving the other.

It is another object of the present invention to provide a color image forming apparatus in which the variation of the rotational speed of the transfer material supporting member due to the application of an external force thereto does not influence the rotational speed of the image bearing member side.

It is a further object of the present invention to provide an image forming apparatus in which non-uniform image transfer is prevented.

It is a further object of the present invention to provide an image forming apparatus which can be applied to an apparatus of a digital scanning type to prevent non-uniform image transfer.

According to an embodiment of the present invention, the color image forming apparatus includes an image bearing member movable along an endless path, on which color toner images are formed, a transfer material supporting member movable along an endless path for supporting transfer material and conveying it to an image transfer position where the color toner images are superimposed and transferred sequentially to the transfer material, a first driving motor for driving the image bearing member, and a second driving motor, separately provided from the first motor, for driving the transfer material supporting member.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 3:
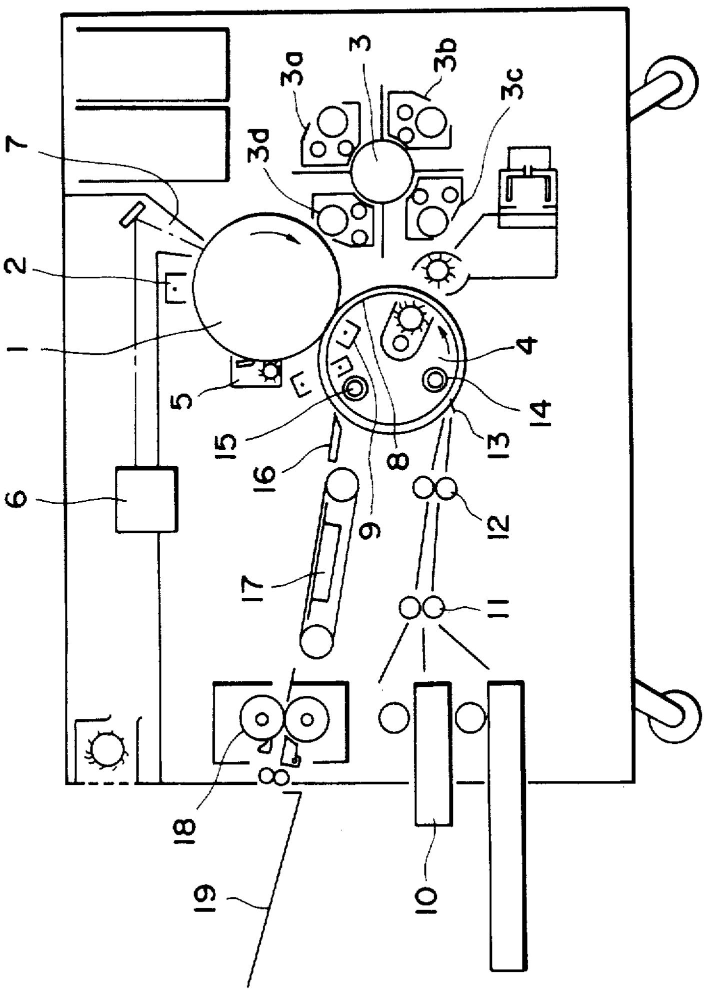
FIG. 3 is a sectional view of a color electrophotographic image forming apparatus of an image transfer type.

Referring to FIG. 3, there is shown a full-color image recording apparatus according to an embodiment of the present invention, comprising an image bearing member in the form of a photosensitive drum 1 rotatable in the clockwise direction. Around the periphery of the photosensitive drum 1, there are provided a primary charger 2, a developing apparatus 3, a transfer material supporting member in the form of a transfer drum 4, and a cleaning device 5. Those devices or means contact or are positioned and opposed closely to the surface of the photosensitive drum 1. Between the primary charger 2 and the developing device 3, there is disposed an image exposure station 7 where the photosensitive drum 1 is scanned by a laser beam directed from a laser scanner 6. The developing device 3, in this embodiment, includes a yellow developing unit 3*a*, a magenta developing unit 3*b*, a cyan developing unit 3*c*, and black developing unit 3*d*, which are circumferentially equidistant from each other and are revolvable as in a turret. They are sequentially opposed to their associated electrostatic latent image at the developing station so as to visualize the electrostatic latent image on the photosensitive drum by the proper color toner.

The toner image thus formed on the photosensitive drum 1 is transferred onto a transfer material supported on the transfer drum 4 by the corona discharge provided by the transfer charger 9 at the transfer station 8. The toner not transferred and retained on the photosensitive drum 1 is removed by the cleaning device 5. The transfer material is fed out of a cassette 10 and conveyed through the nip formed between a roller couple 11 and then is stopped by the nip formed between a couple of registration rollers 12 which are then not rotating. The registration roller couple 12 starts rotating in response to the operation of a gripper 13 provided on the transfer drum 4 so that the transfer material is fed through the registration roller couple 12. The leading edge of the transfer material abuts the gripper 13 which has been opened by a gripper cam 14, and is gripped thereby when the gripper 13 passes by the cam 14, by which the gripper 13 is closed. After a predetermined number of image transfer operations are effected, the transfer material is separated by a separation pawl 16 from the gripper 13 which is now opened by a separation cam 15. The transfer sheet is then conveyed by the conveying station 17, and passes through an image fixing station 18 and is then discharged to an external tray 19.

Figure 2:
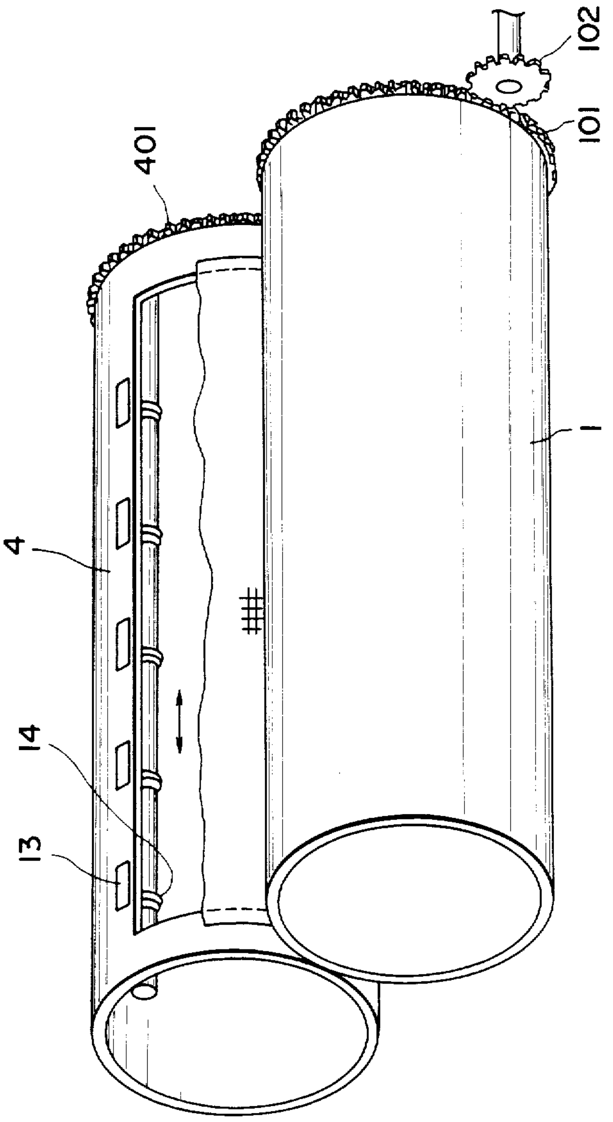
FIG. 2 PRIOR ART
FIG. 2 is a perspective view illustrating a conventional photosensitive drum and transfer drum.

In a conventional apparatus, as shown in FIG. 2, the photosensitive drum 1 and the transfer drum 4 are driven by meshing gears 101 and 401 which are fixedly mounted to the photosensitive drum 1 and the transfer drum 4, respectively and by operatively coupling one of the gears to a driving gear 102 which is driven by a motor. As described hereinbefore, the load to the motor is increased when the gripper 13 on the transfer drum 4 is opened, since it contacts the cams 14 and 15. This results in a change, and more particularly, this results in a reduction of the rotational speed of the motor, and therefore, that of the photosensitive drum 1. On the other hand, the laser scanner effects it scanning operation at a constant frequency. Therefore, the change in the peripheral speed of the photosensitive drum 1 appears as non-uniform pitches or intervals between scan lines.

Figure 1:
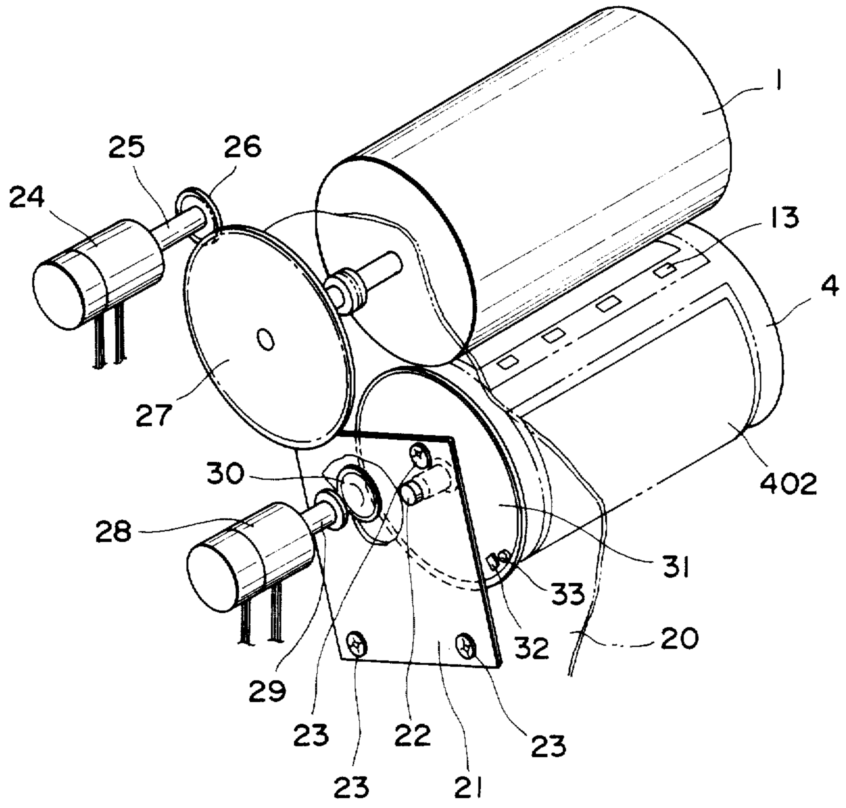
FIG. 1 is a perspective view of a driving mechanism for a photosensitive drum and a transfer drum, using the present invention.
Figure 4:
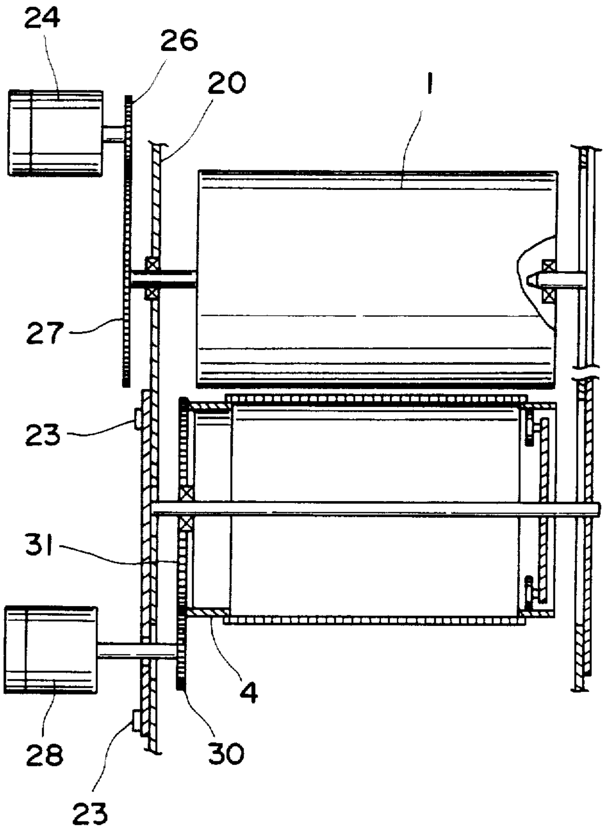
FIG. 4 is a longitudinal sectional view of the photosensitive drum and the transfer drum.

FIGS. 1 and 4 illustrate an embodiment of the present invention, wherein the photosensitive drum 1 is supported by a front plate (not shown) and a rear plate 20, and the transfer drum 4, opposed to the photosensitive drum 1, is supported through a shaft 22 by a supporting member 21 fixed to the plates. The supporting member 21 is movable relative to the front and rear plates, and it is fixed to the front and rear plates by screws 23 after the clearance between the photosensitive drum 1 and the transfer drum 4 is adjusted to be a predetermined value. A driving motor 24 for driving the photosensitive drum 1 is fixed on the rear plate 20, and its output shaft 25 has a gear 26 fixed thereto. The gear 26 is meshed with a photosensitive drum gear 27 which is integrally mounted to a rotational shaft of the photosensitive drum 1. It is preferable for the gear 26 and the photosensitive drum gear 27 to be directly meshed as shown. This is because, if there is a relaying gear therebetween, the possible non-uniform pitch of the relaying gear teeth results in non-uniform rotational speed of the photosensitive drum 1. A transfer drum driving motor 28 is fixed to the supporting member 21, and its output shaft 29 has a gear 30 fixed thereto. The gear 30 is integrally mounted to the photosensitive drum 1 and is meshed with a transfer drum gear 31 rotatable about a supporting shaft 22. They are directly meshed for the same reason that the meshing between the gear 30 and the transfer drum gear 31 mesh with each other. If, however, a sufficient reduction ratio can not be obtained by the direct meshing, a worm gear is conveniently used.

As shown in FIG. 4, the photosensitive drum 1 and the transfer drum 4 do not directly contact each other, but are spaced from each other by a predetermined clearance. The transfer drum 4 is in such a form that a part of the cylindrical drum member is cut away, with the longitudinal end portions and a portion connecting those end portions remaining. The cut-away portion is covered by a transfer material supporting screen which is stretched thereover. Therefore, the "clearance between the photosensitive drum 1 and the transfer drum 4" refers more precisely to the distance between the surface of the photosensitive drum 1 and the surface of the supporting screen. In this embodiment, the clearance is not more than the thickness of the transfer material so as to maintain good transfer efficiency. Therefore, the variations in the load on the transfer drum 4 and other vibrations are not directly transmitted to the photosensitive drum 1. For this reason, the non-uniform rotational speed of the photosensitive drum 1 can result only from the motor 24 and the gears 26 and 27 so that the non-uniformity of the rotational speed can be minimized.

Figure 5:
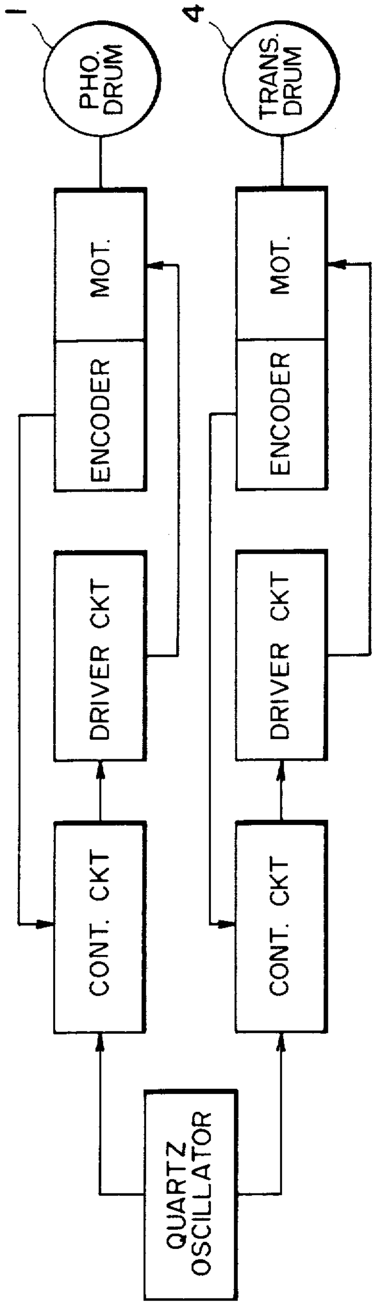
FIG. 5 is a block diagram illustrating the drive control for the photosensitive drum and the transfer drum.

In order to provide a proper synchronization between the photosensitive drum 1 and the transfer drum 4, a common quartz oscillator is used, as shown in FIG. 5, so that the driving motors can be controlled by a phase synchronization loop (PLL). In the arrangement of independent driving shown in this embodiment, the photosensitive drum 1 and the transfer drum 4 have the respective non-uniform rotations so that positional deviation (unsatisfactory registration between color images) can not be avoided at the transfer station. However, it has been confirmed that the deviation can be limited within 0.05–0.1 mm which is generally recognized as a tolerable range of misregistration.

In the case of superposed color transferring, the correct correspondence between the speeds of the photosensitive drum 1 and the transfer drum 4 during the transferring operation is required. Additionally, the correct alignment is required between the leading edge of the toner image on the photosensitive drum 1 and the leading edge of the transfer material, and the correct alignment is required between the leading edges of the respective toner images. Those alignments will now be described.

Figure 6:
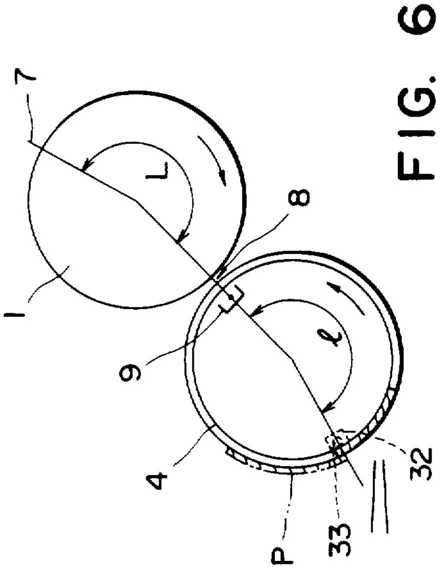
FIG. 6 is a schematic sectional view of the photosensitive drum and the transfer drum.

In FIG. 6, the distance L from the exposure station 7 on the photosensitive drum 1 to the transfer station 8 measured along the direction of rotation of the photosensitive drum 1 is not more than the distance l (ell) from the position where the leading edge of the transfer material P on the transfer drum 4 is detected to the transfer station 8 measured in the direction of its rotation, that is, $L \leqq l$. If, $L=l$, the image exposure starts simultaneously with actuation of a detecting element 32. If $L<l$, the exposure starts with a time delay of an amount corresponding to $(l-L)$ from actuation of the detecting element 32. Detecting element 32 for detecting the leading edge of the transfer material P, can comprise a Hall element or a photointerruptor which is mounted to a side plate of a main frame or a supporting member 21, while an end surface of the gear 31 is provided with a light blocking plate for the photointerruptor or the magnet 33 for the Hall element at a position corresponding to the leading edge of the transfer material.

By this arrangement, it is possible to effect the alignment when the photosensitive drum 1 and the transfer drum 4 are independently driven.

A consideration of the kinds of the image input signals that can be inputted into the apparatus will now be discussed. When real time exposure is effected while reading a printed image or the like by a line sensor or the like, the above described distances L and l are determined so as to satisfy $L<l$, and the movement of the line sensor is started by the signal from the detecting element 32, and the sensor is set so that when the leading edge of the transfer material reaches a distance L from the transfer station 8 on the supporting member, the sensor is at the leading edge of the printed image. In other words, the distance $(l-L)$ is used as a pre-running distance. In this case, variations in the pre-running distance may be a problem. If so, the movement is started earlier, the image signals are stored in a memory to some extent, and the image exposure starts when the leading edge of the transfer material reaches a distance L from the transfer station 8 on the supporting member. In the case of signal provided from computer or other communication machines, the image signal is not a real time signal as described above, and therefore, the distances may be set so that $L=l$.

For the purpose of better understanding, the previous description has been based on the assumption that the diameter of the photosensitive drum 1 is equal to that of the photosensitive drum 4. However, even if they are not equal, the above analysis applies if the distance on the moving path on the photosensitive drum 1 and that on the transfer drum 4 are taken into consideration.

Figure 7:
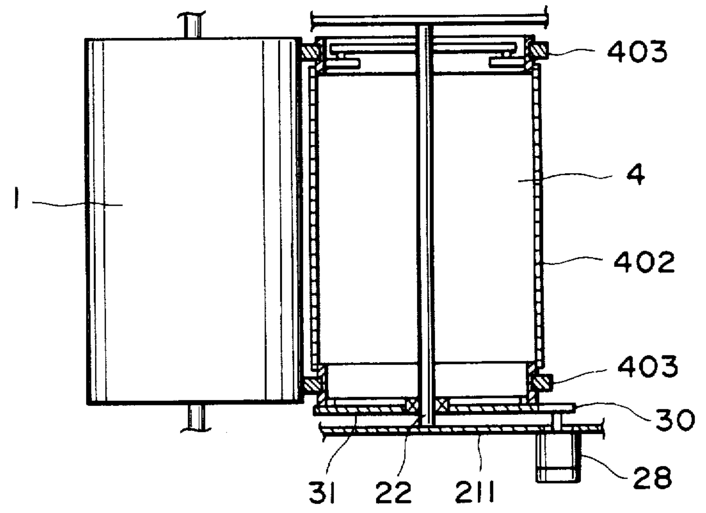
FIGS. 7 and 8 are partial sectional views of the photosensitive drum and the transfer drum illustrating another embodiment of the mechanism for maintaining the clearance between the photosensitive drum and the transfer drum.

In the foregoing description of the embodiment, the transfer drum 4 and the photosensitive drum 1 are kept from contacting each other. However, a possible alternative embodiment is shown in FIG. 7 that in which drums 1 and 4 contacted by a spacer 403 provided at both of the longitudinal end portions of the transfer drum 4. It should be noted that they are still independently driven in this case, too. It is preferable, in this case, that the contacting surface of the spacer 403 is of low friction material, such as PTFE (polytetrafluoroethylene) in the form of a tape, rubber or a coated member. This is preferable because even though the photosensitive drum 1 and the transfer drum 4 are contacted by the spacer 403, the non-uniform rotation of the transfer drum 4, which can influence the rotation of the photosensitive drum 1, can be absorbed by sliding on the spacer 403.

Figure 8:
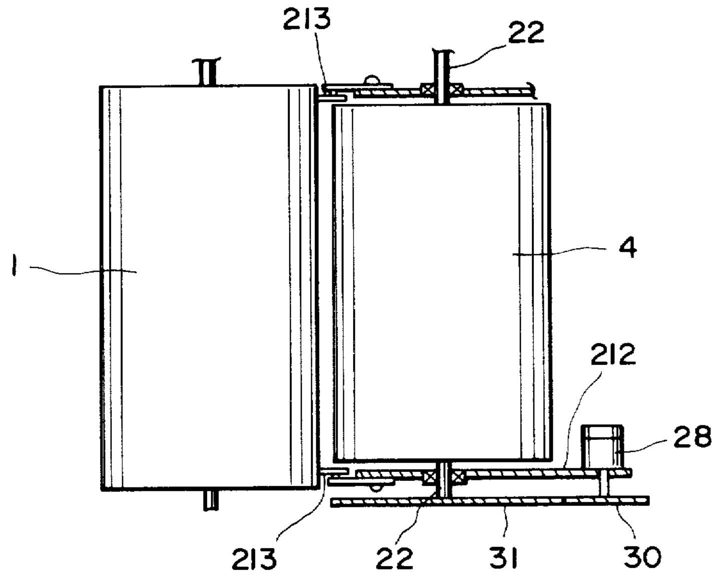

FIG. 8 shows another embodiment, wherein a positioning roller 213 rotatable and contacting the photosensitive drum 1 is rotatably supported on a supporting plate 212 for supporting the rotational shaft 22 of the transfer drum 4. It will be understood that this embodiment has the same advantages as described above. It should be noted that the transfer drum shown in FIG. 8 is not a partly opened cylindrical drum, but is a simply cylindrical or solid (not hollow) drum, as an example. In the arrangements shown in FIGS. 7 and 8, the supporting plates 211 and 212 are not fixed to the side plate of the main frame but are swingable so as to normally urge the transfer drum 4 to the photosensitive drum 1.

The foregoing description has been made with respect to embodiments in which the image bearing member and the transfer material supporting member are both in the form of a drum. However, it is applicable to the case of a combination of an image bearing member in the form of a drum and a supporting member in the form of a belt, and it is applicable to a combination of an image bearing member in the form of a belt and a supporting member in the form of a drum.

Figure 9:
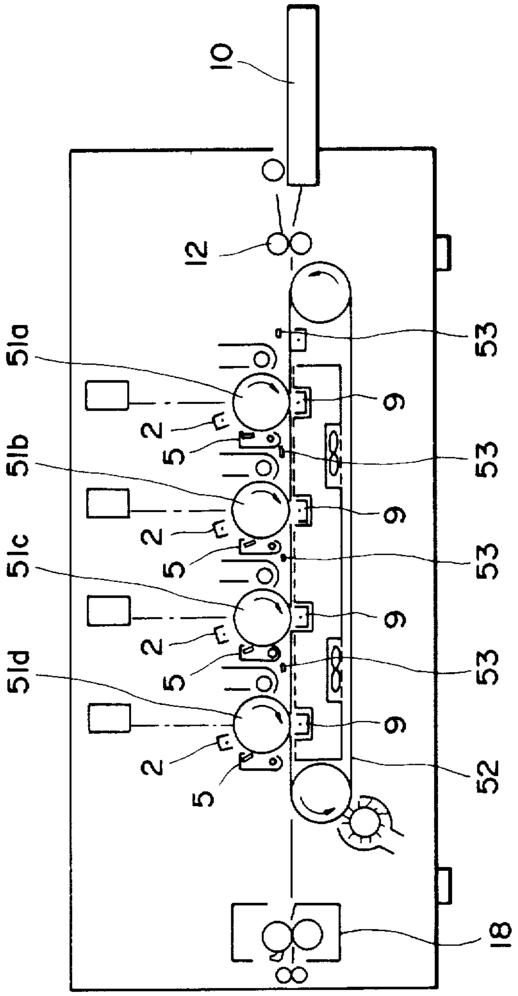
FIG. 9 is a color image forming apparatus according to another embodiment.
Figure 10:
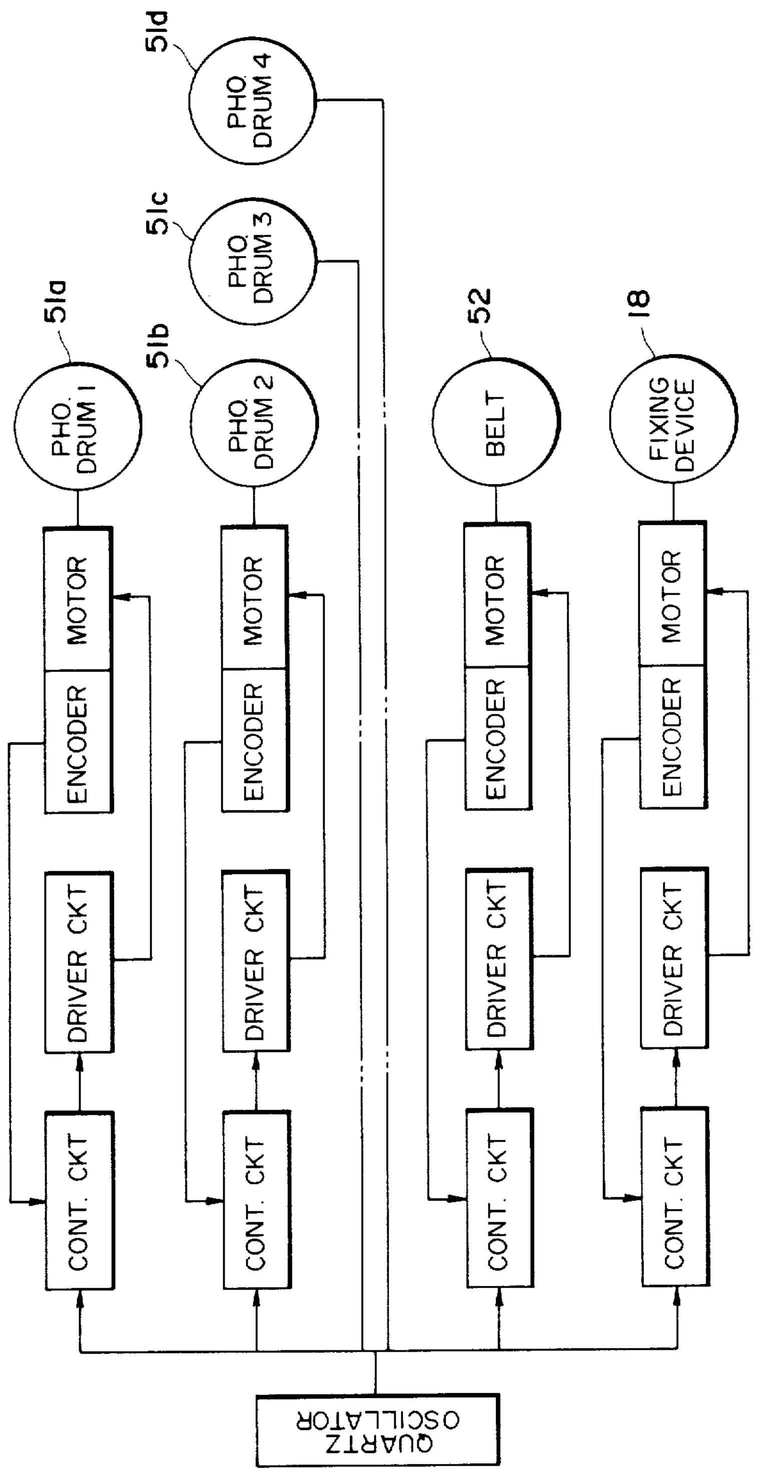
FIG. 10 is a block diagram illustrating the driving method of the photosensitive drum and the transfer belt shown in FIG. 9.

FIG. 9 shows an embodiment in which a plurality of image bearing members **51*a*–51*d* on a line, and a transfer material supporting member 52 in the form of a belt contact each other. In this embodiment, the driving motors for the photosensitive 51*a*–51*d* and for the conveying belt 52 are controlled by a phase synchronizing loop (PLL) using a common quartz oscillator. The alignment between the image and the transfer material, and between the images are the same as in the embodiment described above with the exception that a transfer material leading edge detecting element 53 is employed for each of the photosensitive drums. When, however, the conveying belt 52** has a gripper for gripping the leading edge of the transfer material, the magnet or the light blocking plate can be provided at this position; whereas when no gripper is used, it is not always necessary that the detecting magnet is aligned with the leading edge of the transfer material, so that the leading edge of the transfer material is required to be directly detected. In this case, a detecting member utilizing light or ultrasonic wave may be used.

As for the motor, the above-described motor is a DC motor. However, another synchronization motor such as an AC, pulse motor or the like.

As to the developing agent for developing the latent image, a two component developer containing a coloring toner and a magnetic carrier can be used, and alternatively, a one component coloring toner containing only magnetic coloring toner can be used.

As described, according to this embodiment, a color image forming apparatus of an image transfer type can be provided wherein the image bearing member and the transfer material supporting member are driven by separate driving motors which are synchronized, whereby the influence of the load change in the transfer material supporting member and the image bearing member to the image bearing member or to the transfer material supporting member, respectively can be removed or reduced. Therefore, a high quality color image can be provided without non-uniform coloring.

Additionally, since the image bearing member and the transfer material supporting member are driven by separate driving sources, the variation in the movement of the transfer material during the image forming operation is detected so as to prevent the toner image from being transferred onto the transfer material with a lock of synchronization.

With the structure described above, it is possible that the speed of the drum temporarily changes due to the load change on the photosensitive drum 1 or the transfer drum 4. Particularly with respect to the transfer drum 4, when the gripper 13 is opened, the gripper itself or an associated member contacts the cam 14. By this contact, the rotation of the driving motor 28 is temporarily retarded, with the result that the transfer drum is delayed with respect to the photosensitive drum 1, and as a consequence, the transferred images deviate from their proper positions.

Figure 11:
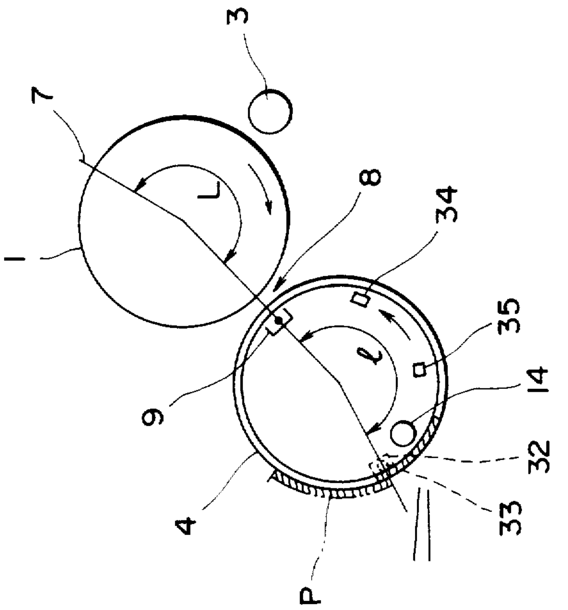
FIG. 11 is a sectional view of the photosensitive drum used with another embodiment of the present invention.

As shown in FIG. 11, in the present invention, the distance L from the exposure station 7 to the transfer station 8, measured on the surface of the photosensitive drum 1 in the direction of its rotation, is not more than the distance l from the position on the transfer drum 4 wherein the leading edge of the transfer material P is detected to the transfer station 8, measured on the surface of the transfer drum 4 in the direction of its rotation, that is $L \leq l$. When $L = l$, the image exposure starts upon the detecting element 32 being actuated. When $L < l$, the image exposure starts with the delay of $(l - L)$ from the actuation of the detecting element 32. The detecting element 32 usable for this purpose is a Hall element or photointerruptor mounted to a side plate of the main flame or the supporting member 21. On an end surface of the gear 31, a light blocking plate for the photointerruptor or a magnet 33 for the Hall element is mounted at a position corresponding to the leading edge of the transfer material P.

However, even if the above structure is adopted, the speed of the drum may temporarily change because of the load change on the photosensitive drum 1 or the transfer drum 4. Particularly in the case of the transfer drum 4, when the gripper 13 is opened, the gripper itself or a member associated therewith contacts the cam 14 and is raised, which results in a temporary reduction in the speed of the driving motor 28, and therefore, the transfer drum 4 is delayed with respect to the photosensitive drum. As a consequence, the position of the transferred image deviates from its proper position.

Figure 12:
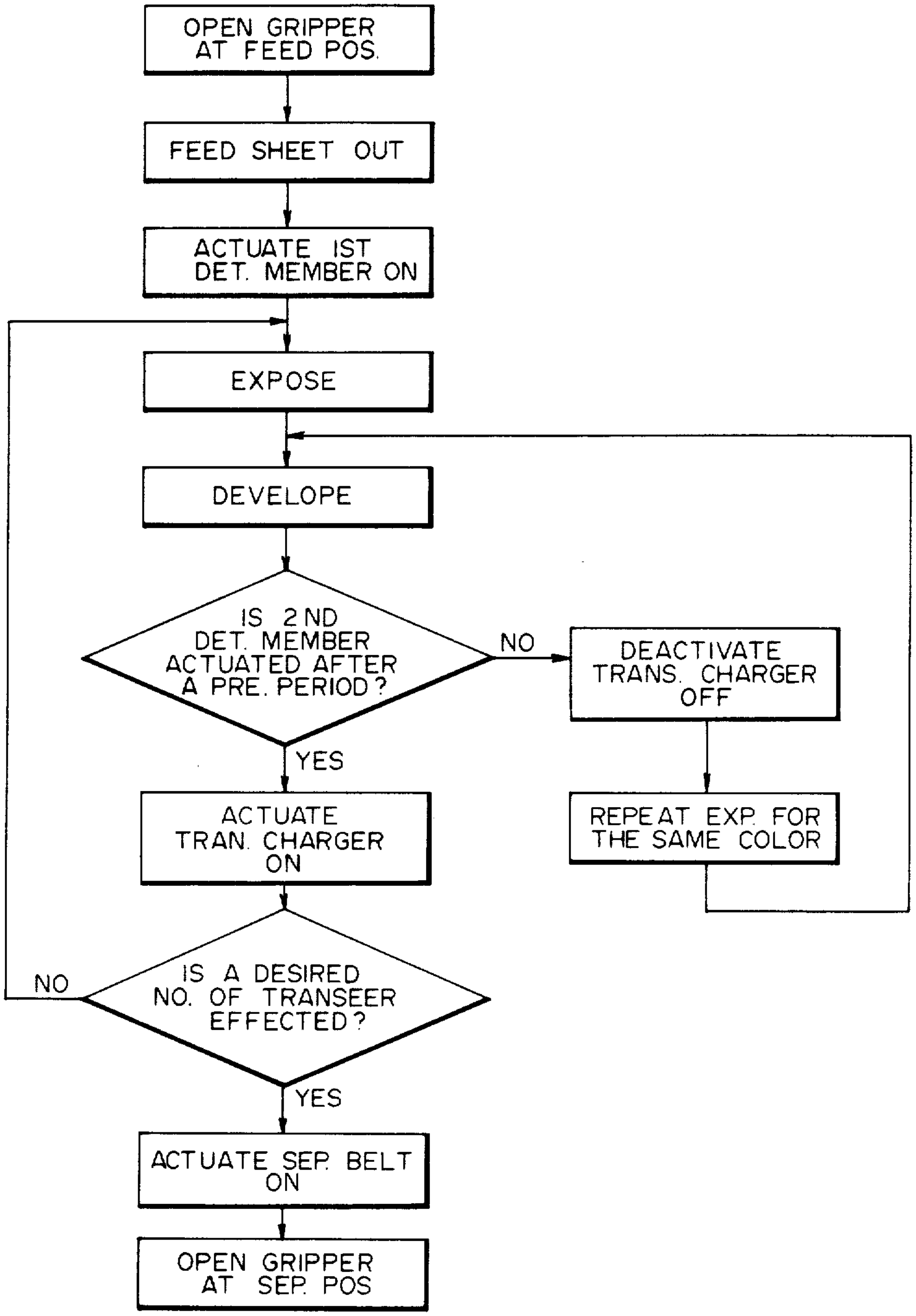
FIG. 12 is a flow chart illustrating the control of the photosensitive drum and the transfer drum.

In the present invention, as shown in FIG. 11, a detecting element 34 is disposed in the moving path of the magnet 33 between the leading edge detecting element 32 and the transfer station or position 8 so as to detect whether the magnet 33, and therefore, the leading edge of the transfer material, passes by the position of this element 34, a predetermined period after it passes the detecting element 32. If it is earlier or later than the predetermined timing, the transfer charger 9 is not actuated, and the image forming cycle for the color is carried out again. The control for this purpose is accomplished using a microcomputer, as shown in FIG. 12.

In this case, the detecting element 32 is a reference for the exposure starting signal and for the speed change detection, and therefore, the limit for the positional deviation is easily set.

In the foregoing description, the photosensitive member and the transfer material supporting member are in the form of a drum, but one or both of these members may be in the form of a belt. Also, in a possible alternative embodiment a detecting element 35 is further provided between the detecting element 32 and the detecting element 34, the detecting element 35 being effective to detect variations variation of variations speed so as to stop the operation of the developing device 3 and/or the operation of the transfer charger 9, so that the image forming cycle is repeated for the same color.

A component developer containing toner and carrier and a one component developer containing magnetic toner only can be used with this embodiment.

As described in the foregoing, according to this embodiment of the present invention in which the image bearing member and the transfer material supporting member are driven separately, the deviation of the color images can be limited within a tolerance, since even when the speed change occurs after the image exposure signal, the image transfer step is not carried out, but an additional image forming cycle is effected for the same color. This provides a good quality image, and the transfer material and the toner are not wasted due to the necessity of repeating an entire image formation for all the colors because of the color image deviation of the resultant image.

In the embodiment described in conjunction with FIG. 11, the peripheral speed of the transfer drum changes temporarily during image formation, which results in problems such as color image deviation, as an example. However, the present invention is conveniently usable even when the peripheral speed of the transfer drum changes periodically due to its structure. For example, the actual rotational axis may slightly deviate from the ideal axis which should exactly be the axis of the rotation of the photosensitive drum because of the degree of accuracy in the positioning of the axis. If the actual rotational axis is slightly eccentric, that is, it deviates by an amount e from the exact or ideal axis, the maximum variation of the peripheral speed of the photosensitive drum 1 is we, where w is an angular velocity (rad/sec) of the photosensitive drum.

If the transfer drum 4 opposed to this photosensitive drum 1 rotates at a uniform speed, the maximum speed difference between the drums is we. Assuming that eccentricity e is 0.1 mm, and that the angular velocity is 5 rad/sec, for example, the speed difference is 0.5 mm/sec. This difference is large enough to reproduce on the transfer material an undesirably enlarged or reduced image, thus disturbing the faithful reproduction of the image. Further, if the length of the periphery of the photosensitive drum 1 does not correspond to the length of one image, color image deviation results.

Figure 13:
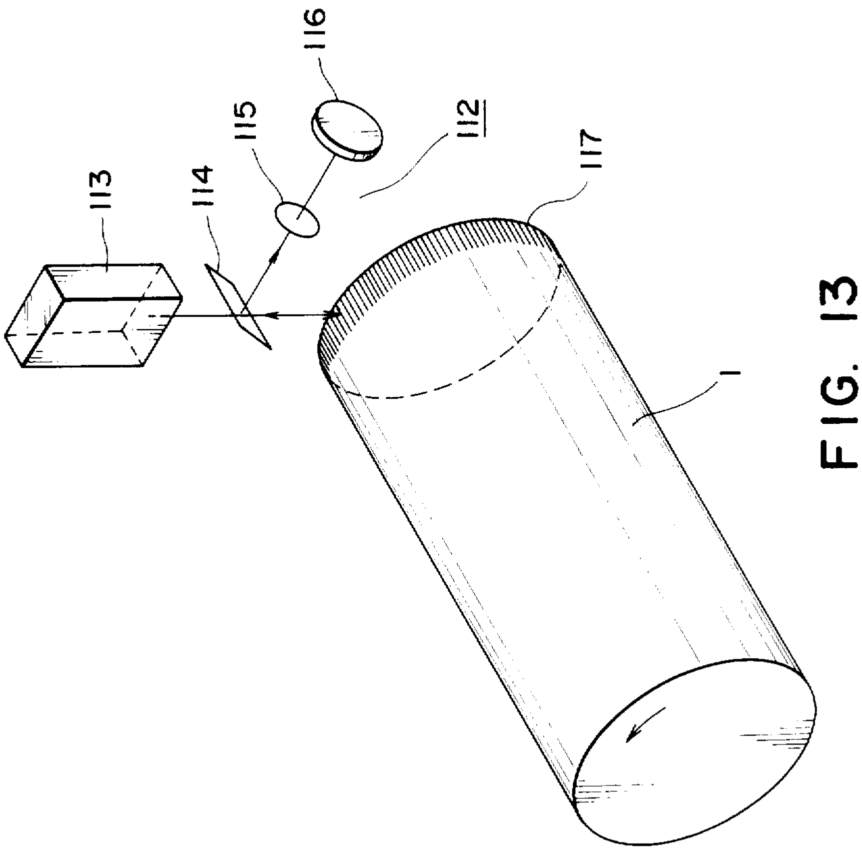
FIG. 13 illustrates the principle of detection by detection means for detecting the peripheral speed of the photosensitive drum used with another embodiment.

FIG. 13 illustrates another embodiment of the present invention, in which the above drawbacks have been eliminated.

In this embodiment, there is provided a speed change detecting means 112 for detecting the speed change of the peripheral speed of the photosensitive drum 1. This detecting means 112 comprises a semiconductor laser source 113, an imaging lens 115, a half mirror 114 and a laser beam detector 116. On the photosensitive drum surface, a pit pattern 117 is formed with fine regular intervals between pits. The laser beam is incident perpendicularly on the pit pattern 117 of the drum surface at a circumferential position corresponding to the exposure position.

In operation, the laser beam produced by the semiconductor laser 113, which is the beam source, is imaged on the pit pattern through the imaging lens 115 and the half mirror 114, the imaging lens 115 being effective to image the laser beam with a reduced spot diameter. When the laser beam is incident at a non-pit portion of the pattern 117, it is reflected by the drum surface back to the half mirror 114 and is received by the detector 116. On the other hand, when it is incident on the pit portion of the pattern 117, the laser beam is scattered so that the detector 116 does not receive the beam. Thus, with the rotation of the photosensitive drum, the detector 116 produces pulse signals consisting of a high level signal and a low level signal in accordance with the pit pattern 117. From the period of the pulse signals, the peripheral speed change of the photosensitive drum 1 can be detected.

Figure 14:
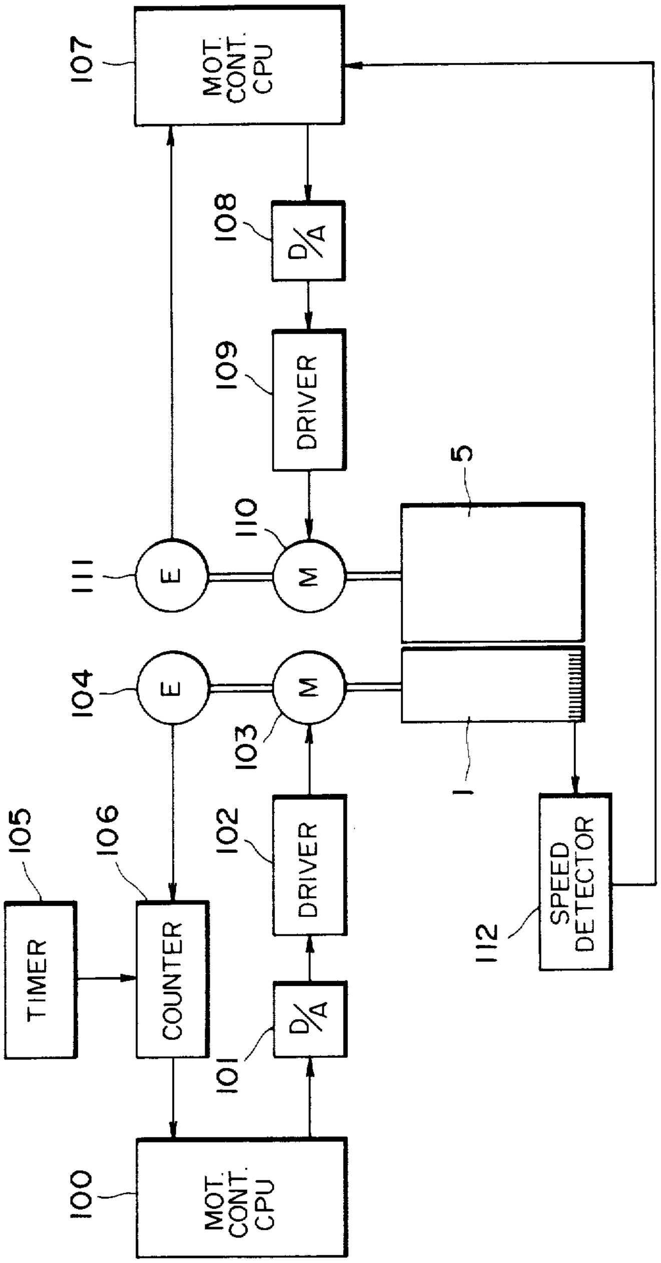
FIG. 14 is a block diagram illustrating the speed control of the present invention.

FIG. 14 is a block diagram illustrating the drive control for the transfer drum 5 carrying the transfer material and the photosensitive drum 1 carrying the image. The photosensitive drum 1 is driven at a constant speed by a first motor 103. The control for maintaining the constant speed is explained as follows. The first motor 103 is provided with an encoder 104 which produces a number of pulses with rotation of the first motor 103. The number of the pulses produced within a predetermined period of time is counted by a counter 106 within a time period defined by a timer 105. The motor 103 is controlled so as to provide the predetermined number of the pulses with the use of a D/A converter 101, a driver circuit 102 and a CPU 100 for controlling the speed of the motor.

The actual peripheral speed of the photosensitive drum surface is detected by the detector 112 as illustrated in FIG. 13.

In order to directly detect the speed of the photosensitive drum surface at the image transfer position, a speed detector 112 may be disposed at the transfer position. As an alternative, the speed detector 112 may be provided at a position other than the image transfer position. In this case, the detected speed is not the speed at the transfer station or position, but is a speed which will occur a predetermined time later, more particularly, the detected speed will exist at the transfer station after the time required for the detected position of the drum 1 reaches the transfer station has passed. Thus, the detected speed is corrected in view of this. Therefore, it is reasonably assumed that the speed detector 112 is at the transfer position.

In FIG. 14, the transfer drum 5 has a diameter which is twice that of the photosensitive drum 1. The photosensitive drum 1 has a pit pattern having 10,000 pits (FIG. 13) adjacent to a longitudinal end thereof, whereby 10,000 pulses are produced per one rotation of the drum. On the other hand, a second motor 110 for driving the transfer drum 5 has an encoder 111 which produces 20,000 pulses per one rotation of the transfer drum. Therefore, by rotating those drums so that the period of the pulses produced by the speed detector 112 and the period of the pulses produced by the encoder 111 are equal, the peripheral speeds of the drums are equal.

Figure 15:
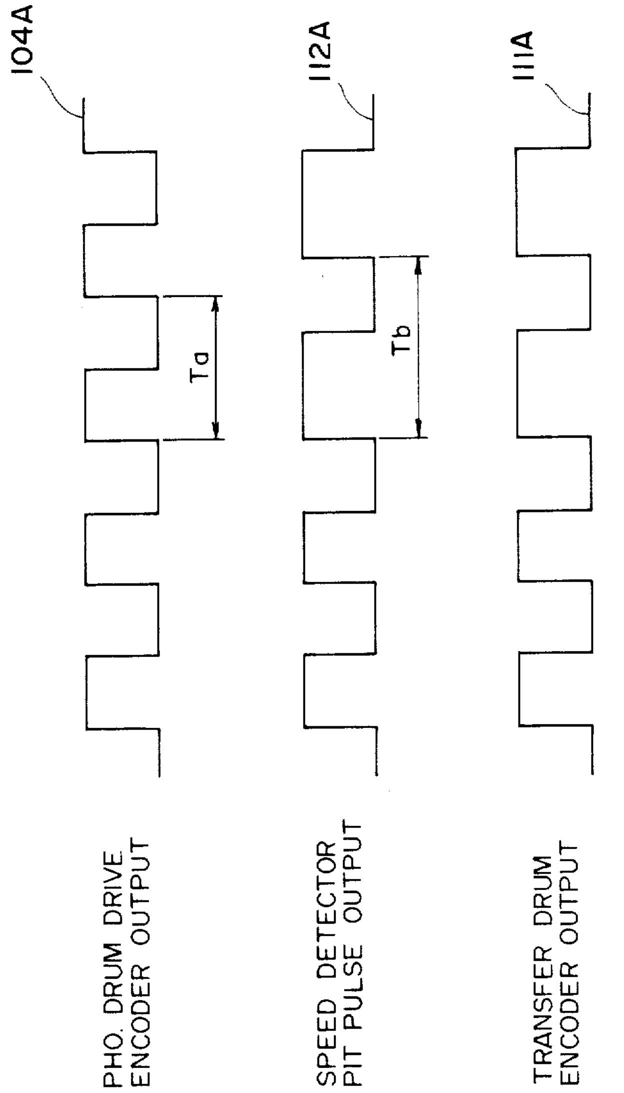
FIG. 15 illustrates pulse signals used with the speed control.

FIG. 15 illustrates an example of the speed control for the drums using pulse signals. When the driving motor 103 drives the photosensitive drum 1 at a constant peripheral speed as described above, the pulses produced by the encoder 104 are as shown by a reference pulse train 104A in FIG. 15, where the period Ta of the pulses is constant. However, if the above described eccentricity e exists due to the mounting of the photosensitive drum 1 on its rotational shaft, the pulses produced by the speed detector 112 detecting the peripheral speed of the photosensitive drum are illustrated by a reference pulse train 112A in FIG. 15, where the period Tb of the pulses changes. The pulses produced by the speed detector 112 are transmitted to the CPU for controlling the transfer drum driving motor, as described above. Simultaneously, the CPU receives the pulses produced by the encoder 111 of the drum driving motor 110, and it compares them. On the basis of the result of the comparison, it produces a control signal for the second motor 115 from the driver circuit 109 through the D/A converter 108 so that the periods of both groups of the pulses are equal.

In FIG. 15, it is assumed that the resolution of the second encoder 111 is equal to that of the pit pattern 117 of the photosensitive drum 1, but this is not absolutely necessary.

According to this embodiment, even if the peripheral speed of the photoesnsitive drum 1 changes due to the eccentricity of the rotational axis of the photosensitive drum, the speed of the transfer material can be controlled to be equal to the actual peripheral speed of the photosensitive drum at the transfer position on the basis of the detected peripheral speed of the photosensitive drum 1.

Figure 16:
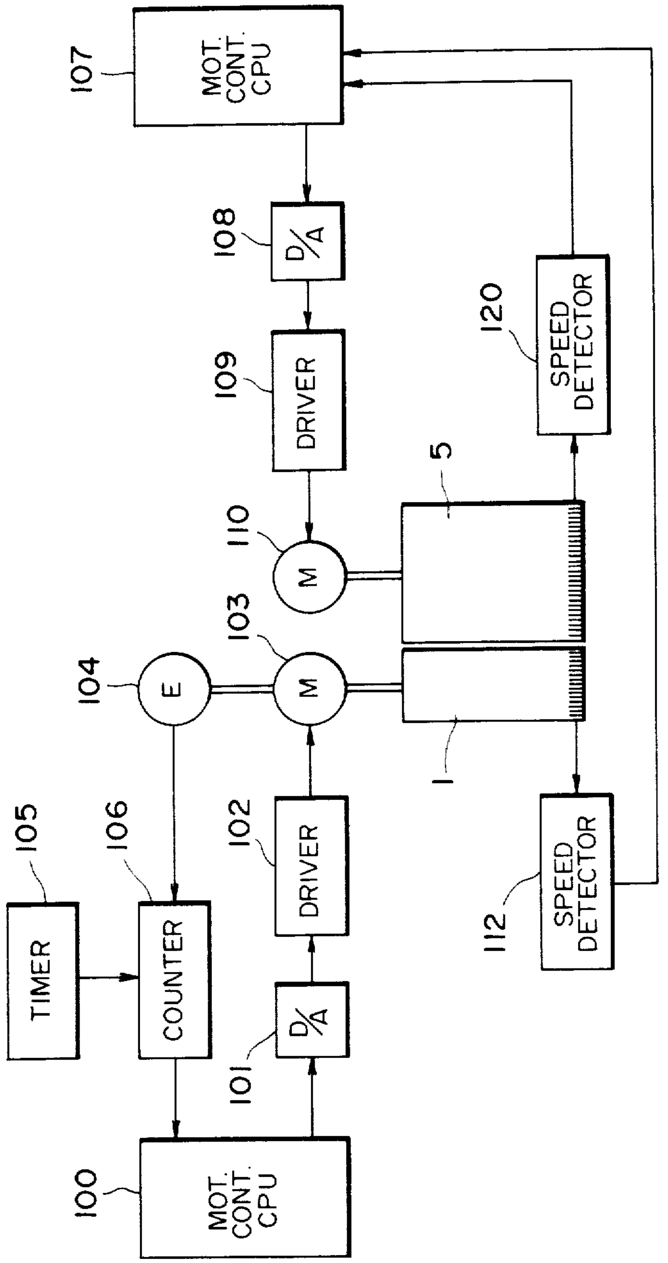
FIG. 16 is a block diagram illustrating another embodiment of the speed control.

FIG. 16 illustrates a modification of the previous embodiment. In this embodiment, the speed detector as described in conjunction with FIG. 13 is disposed at each of the photosensitive drum 1 and the transfer drum 5. The second motor 110 is driven so that the speed signals provided by those detectors are equal. In this case, those detectors 112 and 120 may be disposed at any position, but it is necessary that the speeds are compared after the correction is effected in this manner, for example. The detected speed is not the speed thereof at the transfer station or position, but is a speed which will occur a predetermined time later. More particularly, the detected speed will exist at the transfer station after the time required for the detected position of the drum 1 reaches the transfer station has passed. Thus, the detected speed is corrected in view of this.

According to this embodiment, the transfer material can be moved in accord with the peripheral speed of the image on the photosensitive drum, whereby the positional deviation does not occur during the image transfer operation so that the expansion and the reduction can be prevented, and therefore, a sharp and clear image can be provided. Additionally, since the speed of the actual image formation surface is detected and controlled, the above-described advantage can be provided even when the image bearing member such as a photosensitive drum is exchanged for another drum.

In the foregoing description, a color copying apparatus having the transfer drum is described, but the invention is not limited thereto. The present invention is applicable to the case where an image is formed on an image bearing member which is movable along an endless path, and the image is transferred onto a transfer material.

While the invention has been described with reference to the structures disclosed herein, it is not confined to the details set forth and this application is intended to cover such modifications or changes as may come within the purposes of the improvements or the scope of the following claims.

What is claimed is:

1. A color image forming apparatus, comprising:
- an image bearing member movable along an endless path, on which color toner images are formed;
- a transfer material supporting member movable along an endless path for supporting a transfer material and conveying it to an image transfer position where the color toner images are superimposed and transferred sequentially to the transfer material, the transfer material supporting member being opposed to said image bearing member with a predetermined clearance therebetween;
- gripping means, mounted on said transfer material supporting member, for gripping a leading end portion of the transfer material supported by said transfer material supporting member;
- means for operating said gripping means;
- a first driving motor for driving said image bearing member; and
- a second driving motor, separately provided from said first motor, for driving said transfer material supporting member.

2. An apparatus according to claim 1, wherein said predetermined clearance is less than the thickness of said transfer material.

3. An apparatus according to claim 1, further comprising a low friction member in contact with said image bearing member and said transfer material supporting member, to maintain said predetermined clearance.

4. An apparatus according to claim 1, further comprising a rotatable member for maintaining a constant clearance between said image bearing member and said transfer material supporting member, said rotatable member is rotatable contacting and following at least one of said image bearing member and said transfer material supporting member.

5. An apparatus according to claim 1, wherein said first and second driving motors are controlled by a phase synchronization loop using a common quartz oscillator.

6. An apparatus according to claim 1, wherein said transfer material supporting member is in a form of a drum.

7. An apparatus according to claim 1, wherein said transfer material supporting member is in a form of a belt.

8. An apparatus according to claim 1, wherein said image bearing member is a single electrophotographic photosensitive member.

9.. An apparatus according to claim 1, wherein said image bearing member includes a plurality of electrophotographic photosensitive members for respective color components.

10. A color image forming apparatus, comprising:
- an image bearing member movable along an endless path, on which color toner images are formed;
- a transfer material supporting member movable along an endless path for supporting a transfer material and conveying it to an image transfer position where the color toner images are superposedly transferred sequentially to the transfer material;
- a first driving motor for driving said image bearing member;
- a second driving motor, separately provided from said first motor, for driving said transfer material supporting member;
- means for detecting a speed of movement of a surface of the transfer material;
- means for discriminating whether a variation of the speed detected by said detecting means is within a tolerable range or not; and
- control means, responsive to said discriminating means, for stopping operation of a subsequent image transfer step when the variation is beyond the tolerable range, and a latent image forming and developing and transferring step is repeated.

11. An apparatus according to claim 10, wherein said control means includes a first detecting member for detecting movement of a predetermined position of said transfer material supporting member and a second detecting member disposed between the position of said first detecting member and a position of the predetermined position when a leading edge of the transfer material on a moving path of the predetermined position is at the transfer position, wherein when the predetermined position does not pass by said second detecting member at the point of time which is predetermined period after the predetermined position passes by said first detecting member, the subsequent image transfer operation is not effected, but the image forming operation for the same color is executed.

12. An apparatus according to claim 11, wherein said first detecting member is a signal source for starting image forming operation on said image bearing member.

13. A color image forming apparatus, comprising:
- an image bearing member movable along an endless path, on which color toner images are formed;
- a transfer material supporting member movable along an endless path for supporting a transfer material and conveying it to an image transfer position where the color toner images are superimposed and transferred sequentially to the transfer material;
- a first driving motor for driving said image bearing member;
- a second driving motor, separately provided from said first motor, for driving said transfer material supporting member;
- signal generating means for generating a signal indicative of the speed of said transfer material supporting member; and
- means for controlling said transfer material supporting member in accordance with the signal from said signal generating means.

14. An apparatus according to claim 13, wherein said control means controls said second driving motor.

15. A color image forming apparatus comprising:
- an image bearing member movable along an endless path, on which color toner images are formed;
- a transfer material supporting member movable along an endless path for supporting a transfer material and conveying it to an image transfer position where the color toner images are superimposed and transferred sequentially to the transfer material;
- a first driving motor for driving said image bearing member; and
- a second driving motor, separately provided from said first motor, for driving said transfer material supporting member;

signal generating means for generating a signal indicative of the surface speed of the transfer material; and means for discriminating whether the surface speed of the transfer material is proper in accordance with the signal from said signal generating means to inhibit color image formation on the transfer material when said discriminating means discriminates an improper surface speed.

16. An apparatus according to claim 1, further comprising:

means for uniformly charging said image bearing member;

means for exposing said image bearing member, after being charged by said charging means, to a laser beam containing information, to form a latent image; and means for developing a latent image formed by said exposing means.

17. An apparatus according to claim 13, further comprising:

means for uniformly charging said image bearing member;

means for exposing said image bearing member, after being charged by said charging means, to laser beam containing information, to form a latent image; and means for developing a latent image formed by said exposing means.

18. An apparatus according to claim 14, further comprising:

means for uniformly charging said image bearing member;

means for exposing said image bearing member, after being charged by said charging means, to a laser beam containing information, to form a latent image; and means for developing a latent image formed by said exposing means.

* * * * *

UNITED STATES PATENT AND TRADEMARK OFFICE

CERTIFICATE OF CORRECTION

PATENT NO. : 4,723,145
DATED : February 2, 1988
INVENTOR(S) : YUSAKU TAKADA, ET AL.

It is certified that error appears in the above-identified patent and that said Letters Patent is hereby corrected as shown below:

Column 1, line 60, "a" should read --an--.

Column 3, line 67, "it" should read --its--.

Column 6, line 40, "photosensitive 51a-51d" should read --photosensitive drum 51a-51d--;

line 59, "like." should read --like can be used.--.

Column 7, line 10, "variation" should read --variations--;
line 12, "is" should read --are--;
line 13, "lock" should read --lack--;
line 22, "drum" should read --drum 4--;
line 31, "wherein" should read --where--;
line 41, "flame" should read --frame--.

UNITED STATES PATENT AND TRADEMARK OFFICE
CERTIFICATE OF CORRECTION

PATENT NO. : 4,723,145

DATED : February 2, 1988

INVENTOR(S) : YUSAKU TAKADA, ET AL.

It is certified that error appears in the above-identified patent and that said Letters Patent is hereby corrected as shown below:

Column 8, line 12, "variations variation of variations" should read --variations of--;

line 16, "component" should read --two component--.

Column 14, line 6, "laser" should read --a laser--.

IN THE DRAWING:

Sheet 10,

Fig. 12, "DEVELOPE" should read --DEVELOP--.

Signed and Sealed this

Fifth Day of July, 1988

*Attest:*

DONALD J. QUIGG

*Attesting Officer*

*Commissioner of Patents and Trademarks*